July 16, 1963 A. LITCHARD 3,097,715
WEIGHING SCALE
Filed Oct. 18, 1960 2 Sheets-Sheet 1

INVENTOR.
Alexander Litchard,
BY
Parker Brochin,
ATTORNEYS.

July 16, 1963 A. LITCHARD 3,097,715
WEIGHING SCALE
Filed Oct. 18, 1960 2 Sheets-Sheet 2
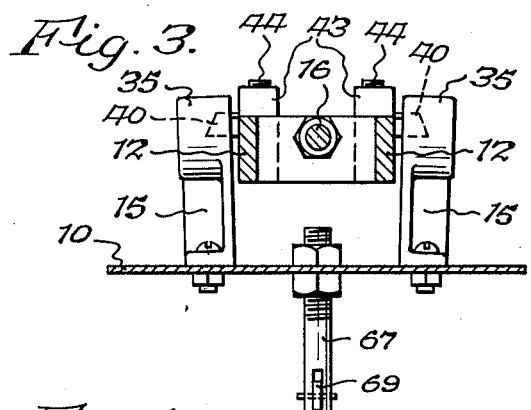
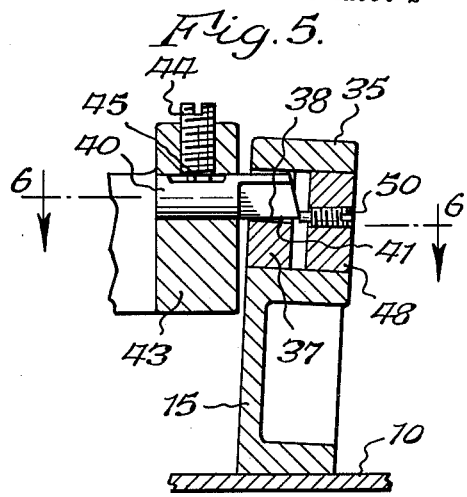
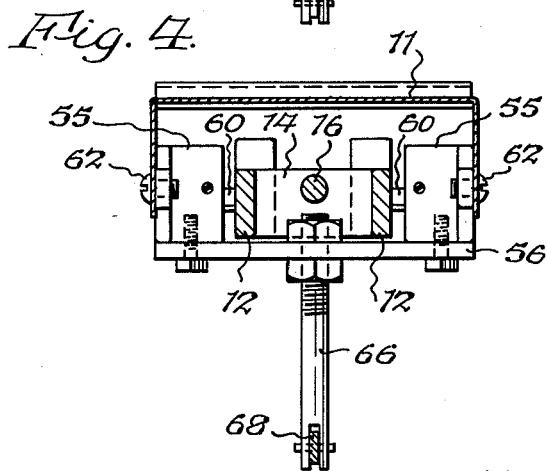
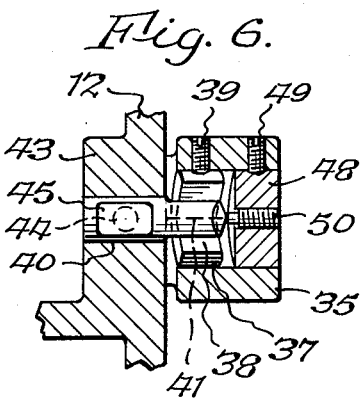
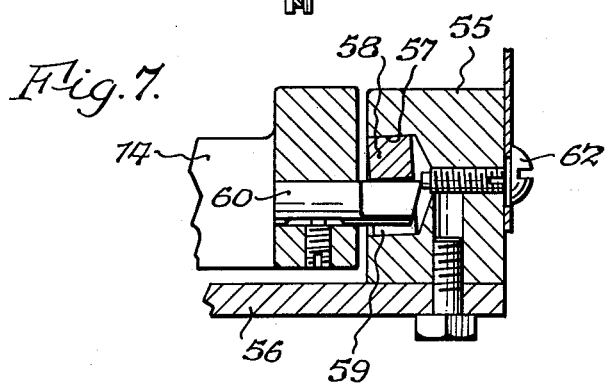
INVENTOR.
Alexander Litchard
BY
Parker & Goodman
ATTORNEYS.

United States Patent Office 3,097,715
Patented July 16, 1963

3,097,715
WEIGHING SCALE
Alexander Litchard, 322 N. Main St., Wellsville, N.Y.
Filed Oct. 18, 1960, Ser. No. 63,324
4 Claims. (Cl. 177—246)

This invention relates to weighing scales, and particularly to the predetermined weight scales such as may be used for example in connection with packaging machines.

Scales of this type, as commonly used at the present time, require frequent return of the scales or parts thereof to the manufacturer for replacement and adjustment of bearing components and other parts of the scale. The knife bearings and other sensitive parts of these scales are subject to considerable wear, so that it is necessary to keep them in good condition since accuracy of the scale depends to a large extent on these knife-edge bearings.

One of the objects of this invention is to provide a scale with bearings of improved construction for replacing the usual knife edge bearings. Another object is to provide bearings with point contacts in place of the usual line contacts of knife edge bearings. A further object is to provide bearings which can easily be adjusted to provide different point contacts in case one set of point contacts becomes worn. It is also an object to provide bearings having parts which can be readily replaced when the wear of the bearings interferes with the accuracy of the scale. It is also an object of this invention to provide a scale of this type in which the scale lever is provided with adjusting means of improved construction which are readily adjustable for setting the scale accurately for the desired weight.

Figure 2:
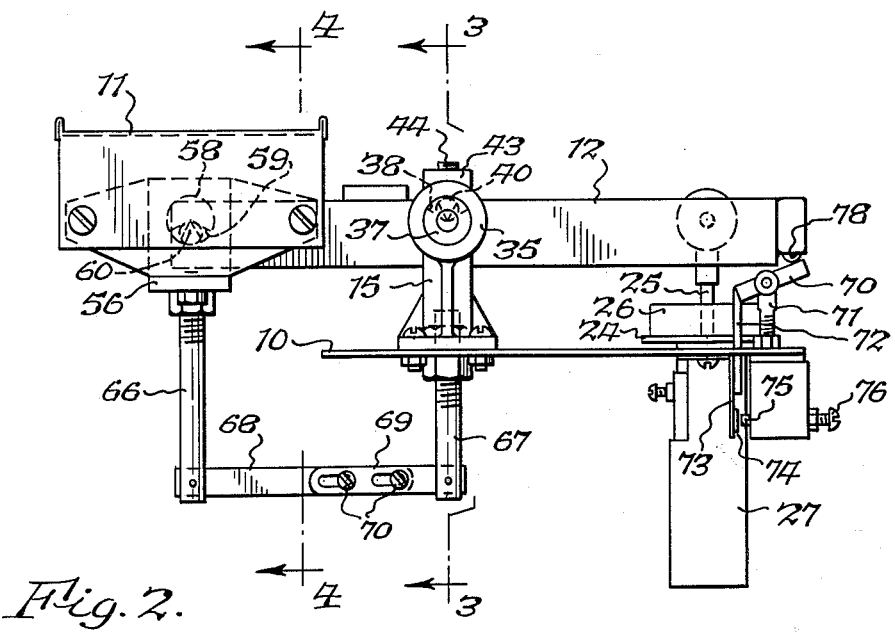
FIG. 2 is a side elevation thereof.

FIGS. 3 and 4 are transverse sectional elevations thereof on lines 3—3 and 4—4, FIG. 2.

Figure 1:
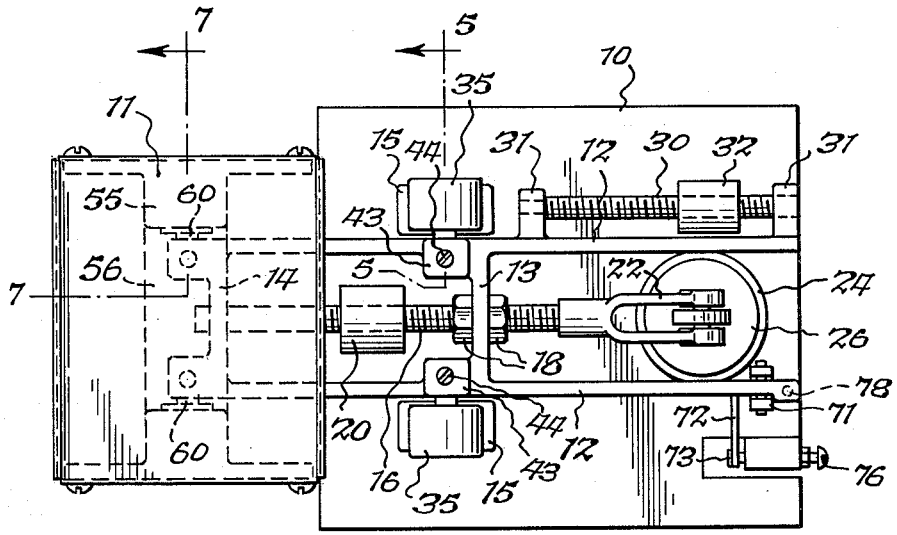
FIG. 1 is a top plan view of a weighing scale embodying this invention.

FIG. 5 is a fragmentary section thereof on an enlarged scale on line 5—5, FIG. 1.

FIG. 6 is a fragmentary sectional plan view thereof on line 6—6, FIG. 5.

FIG. 7 is a fragmentary sectional elevation thereof on line 7—7, FIG. 1.

The scale illustrated by way of example to facilitate understanding of my invention but not for purposes of limitation includes a base 10 which in the particular construction shown is in the form of a plate. The scale has a platform 11 on which the containers or articles to be weighed are positioned, and this platform is mounted on one end of the scale lever which in the particular construction illustrated is formed with two longitudinally extending structural members 12 connected by cross members 13 and 14. This lever is preferably of unitary construction and may be a casting or stamping and is pivoted intermediate of its ends on a pillar or standard 15 secured on the base 10 and extending upwardly therefrom. The end of the lever opposite the platform is provided with an electric contact device by means of which a circuit is completed when the desired weight has been placed on the platform 11.

In addition to the lever a center scale bar 16 is provided which is mounted on the cross bars 13 and 14 of the lever frame and is adjustable lengthwise of this lever. For this purpose the scale bar is screw threaded throughout the greater part of its length to facilitate adjusting the same on the cross member 13. This adjustment may be effected by means of a pair of nuts 18 engaging the threaded part of the scale bar and arranged at opposite sides of the cross member 13. These nuts serve to lock the scale bar in place when correctly adjusted. The scale bar also has adjustably mounted on the threaded portion thereof a balancing weight 20 which is adjustable lengthwise of the scale bar by turning the same about the axis of the scale bar. An end of this scale bar extends through a hole in the cross member 14.

The scale bar is provided at its outer end with a clevis 22 which supports a counterpoise support member 24 suspended from the clevis by means of a rod 25. A weight 26 of any suitable size may be mounted on the support 24, as usual, and the counterpoise support 24 may be suitably connected with a dash pot 27 of any usual type. By means of the construction described, it is possible to adjust the scale bar lengthwise of the lever so that the pivot distances from the center fulcrum of the lever to the bearing of the scale platform 11 is equal to the fulcrum for the weight 26. If desired the scale bar may be adjusted in the direction of its length to provide different ratios of the pivot distances, thus greatly increasing the capacity of the scale to operate on different weights. The weight 20 may also be adjusted lengthwise of the scale bar 16 to obtain a zero adjustment of the scale.

An additional weight adjusting beam is arranged on the exterior of the scale lever. This beam is in the form of a screw threaded rod 30 secured on the bracket 31 extending outwardly from a side of the scale lever, and a weight 32 has a threaded engagement with the beam 30 to effect the scale for obtaining the desired tare weight by adjusting the weight 32 lengthwise of the beam 30.

The scale lever is supported intermediate of its ends on bearings supported on pillars or standards 15 which are provided at their upper ends with cylindrical hubs or bearing supports 35 which have cylindrical apertures extending transversely of the lever. Each of these apertures is provided with a bearing member 37, and in the particular construction shown, this bearing member is provided with a V-shaped notch or recess 38 in the upper portion thereof. The bearing member 37 may be held in the cylindrical aperture of the bearing support 35 in any suitable manner, for example, by means of a set screw 39. The other bearing member of my improved bearing construction is in the form of a substantially cylindrical body 40 having an end thereof shaped to form a knife edge 41, the edge portion being formed to fit into the V-shaped recess or notch of the other bearing member 37. The cylindrical portion of the bearing member 40 may be supported on the scale lever 12 in any suitable manner, for example, in holes formed in lugs or enlargements 43 of the scale lever 12. The cylindrical part of each bearing member 40 extends into this hole and is locked in place therein by means of a flat-ended set screw 44.

In order to ensure the proper support of the knife-edge bearing member 40, the upper face of the bearing member 40 is preferably provided with a flat part 45 with which the set screw 44 engages to hold the bearing member 40 in place on the lever and also to support it in correct relation to the other bearing member 37.

The knife edge in bearings as heretofore commonly made for use in connection with scales is designed to rest in the apex of the notch or recess 38 in the other bearing member. This made it necessary for the knife edge to be in correct alinement with the apex or inner part of the notch in the cooperating bearing member, since otherwise there would be a high frictional resistance to movement of one bearing member relatively to the other. I have found, however, that better results can be obtained by arranging the two bearing members in such a manner that they are inclined vertically relatively to each other so that the knife edge will bear only on an end portion of the apex of the notch or recess of the other bearing member. This results in a point bearing rather than a knife edge bearing and this consequently produces a more sensitive bearing having less frictional resistance to movement. This inclination of one of the bearing members relatively to the other may be effected in any suitable or desired manner, and in the construction shown in FIGS. 3 and 5, I have mounted the pillars or posts to extend upwardly from the base 10 at a slight angle to the vertical as clearly shown in FIGS. 3 and 5. It will thus be noted that the knife edge 41 bears only at an end of the apex of the notch or recess 38 and this in effect produces a point bearing with the resulting reduction in friction. It will also be noted that by means of this point bearing between the two bearing members 37 and 40, considerably less accuracy is required in aligning these two bearing members, thus reducing the expense in assembling the bearing and maintaining it in operation.

It will further be noted that the knife edge bearing member 40 may be readily removed from the scale lever by loosening the set screw 44, and also this member is adjustable in the direction of its length relative to the bearing member 37 so that if the contact point of the knife edge 41 becomes worn the bearing member 40 may be adjusted slightly in the direction of its length to present a different part of the knife edge to the bearing member 37, thus renewing the point bearing. Also if a part of the apex of the notch or recess 38 becomes worn down, the knife edge 41 will also have to move downwardly to a very slight extent thus providing a new point of contact with the bearing member 37.

It is also desirable to hold the bearing member 40 against movement in the direction of its length relative to the bearing member 37 except when adjusted, and for this purpose I have provided a stop disk 48 which also fits into the aperture of the support 35 and is held in place therein by means of a set screw 49, FIG. 6. This stop member is provided with a threaded hole formed to receive a stop pin 50, the inner end of which extends into position to engage the outer end of the knife 41 and thus limit lengthwise movement of the same relative to the bearing member 37.

The support of the platform 11 of the scale lever 12 is also effected through a point bearing which is shown in detail in FIG. 7 and in which the bearing parts described in FIG. 5 are merely reversed. In this construction 55 represents one of the two parts of the frame work which supports the platform 11, and 56 is a horizontally extending tie rod or frame member which connects the two parts 55. Two parts 55 are each provided with a hole or recess 57 which in this case is inclined inwardly and upwardly. A bearing member 58, provided with a notch or recess 59, corresponds to the bearing member 37 and is suitably secured in the platform supporting member 55. The knife edge member 60 which may be similar in construction to the bearing member 40 which has been described is seated with its edge extending upwardly in an aperture formed in a lug or extension of the transverse member 14 of the scale lever. Movement lengthwise of the knife edge is prevented in this case by means of a stop screw 62 arranged in a threaded aperture in the frame member 55 and extending into position to engage the end of the knife edge portion of the bearing member 60.

Means are also provided to hold the scale platform 11 against tilting on its bearing support on the lever 12, and for this purpose the supporting frame of the platform is provided with a downwardly extending rod or post 66 which is connected with a rigid downwardly extending rod or post 67 secured to the base 10 of the scale. The lower ends of these two rods are pivotally connected by means of a link which may be formed of two parts 68 and 69 adjustably connected with each other by means of clamping screws 70, the link parts 68 and 69 being pivotally connected to the lower ends of the posts 66 and 67.

In order to correctly support the scale platform relatively to the lever 12, the posts 66 and 67 must be parallel to each other and the pivotal connections of the posts with the link comprising the parts 68 and 69 must be equidistant from the bearings of the lever and the scale platform. Consequently one or both of the posts may be adjusted vertically relatively to their supports, and in the construction shown, both posts have their upper ends threaded and adjustably mounted, the post 67 being secured on the base 10 at the desired height by suitable nuts, and the upper end of the post 67 may be similarly secured on the tie rod 56.

The two parts 68 and 69 of the lower link can also be adjusted relative to each other to correctly space the lower ends of the posts 66 and 67. When these various parts are correctly related to each other so that the two posts 66 and 67, the link connecting the lower ends of the same, and an imaginary line connecting the platform bearing and the lever bearing, form a parallelogram, then the weight of the material on the platform 11 will be accurately determined regardless of whether the material is in the middle of this platform or at either side thereof. In making the adjustment, the post or rod 67 may be arranged in fixed relation to the base so that the only adjustment necessary will be on the rod 66.

Near the end of the scale lever opposite to the platform 11 is provided a lever 70 pivoted on a post 71 mounted on the base 10 of the scale. The lever 70 has a fixed arm 72 secured thereto, the lower end of which has a contact member 73 secured thereto which has a contact terminal 74 positioned to engage a stationary contact 75 which constitutes an end of an adjusting screw 76. As long as the counter weight 26 is in excess of the weight on the scale platform, the pivot arm 70 is held in a position in which the contacts 74 and 75 are out of engagement with each other. The scale lever has a ball shaped part 78 which engages the pivot arm 70 and holds the contacts apart.

However, when the desired weight has been placed on the platform, the scale lever swings about its bearings and permits the outer end of the arm 70 to swing upwardly thus causing the contacts 74 and 75 to engage. This completes a circuit (not shown) for stopping the feed of material to the platform 11.

The advantage of this construction is that practically no effort was required to lift the ball shaped part 78 out of engagement with the arm 70 and no force is required to move the contacts into engagement since the parts 72 and 73 of the lever are heavier than the arm contacted by the ball shaped part 78 so that the contact is made as soon as the scale lever moves out of engagement with the arm 70.

The scale described has the advantage that the bearings can be readily removed and replaced, and accurate point contacts at the bearings can be obtained without requiring skill on the part of the user of the scale, since it will be obvious that the positioning of the two members of any bearing is not critical to obtain point contacts of the two members. Also the two adjustable counter weights 20 and 32 are located to be readily accessible and adjustable. In case of wear of the bearings, a slight adjustment of either bearing member will again result in a new point contact and restore the accuracy of the scale.

It will be understood that various changes in the details, materials and arrangements of parts, which have been herein described and illustrated in order to explain the nature of the invention, may be made by those skilled in the art, within the principle and scope of the invention, as expressed in the appended claims.

I claim:

1. A weighing scale having a base and a lever pivoted on said base, a column extending upwardly from said base and at an inclination to the vertical, a bearing member supported on said column and having a V-shaped recess formed therein, another bearing member mounted on said lever and having a knife edge formed to bear in said recess, said recess of said first mentioned bearing member being inclined with relation to said knife edge, whereby said knife edge will contact said recess in said first mentioned bearing member at a point only, and adjustable means for varying the positions of said bearing members lengthwise of each other.

2. A weighing scale having a base and a lever pivoted on said base, a column extending upwardly from said base and having a substantially cylindrical aperture, a substantially cylindrical bearing member in said aperture and having a V-shaped recess in the upper portion thereof, said lever including a second bearing member adjustable transversely of said lever and having a knife edge extending into said recess and bear on the bottom thereof, said knife edge and said recess being arranged out of horizontal alinement so that said knife edge engages in said recess only at a point, and an adjustable stop pin engaging an end of said knife edge for adjusting said knife edge lengthwise to vary the point of contact of said knife edge with said recess, said knife edge bearing on the part of the bottom of said recess farthest removed from said adjustable stop pin.

3. A bearing including a pair of knife edge bearing members extending in opposite directions from a central point, a pair of recessed bearing members having recesses in which the knife edge bearings may rest, the bottoms of said recessed members sloping downwardly in opposite directions away from said central point, said knife edges bearing on the parts of the bottoms of the recesses nearest to the space between said knife edge bearing members, one of said bearing members being adjustable in the direction of the length of said knife edge to present different portions of the length of said knife edge into operative relation to the end of said recess without producing inclination of said bearing members.

4. A weighing scale having a lever and structure cooperating therewith such as a base and a platform for supporting the material to be weighed, cooperating bearing members connecting with said lever and said cooperating structure and each bearing member having a substantially cylindrical part, said lever and said cooperating structure having substantially cylindrical apertures which removably receive said substantially cylindrical parts of said bearing members, and clamping means for releasably locking said substantially cylindrical parts of said bearing member in said apertures, one of each pair of said bearing members having a recess and the other member of each pair of bearing members having a knife edge extending into and beyond said recess, said cylindrical apertures which receive said cylindrical part of cooperating bearing members being out of vertical alinement with each other by sloping downwardly in opposite directions away from each other.

References Cited in the file of this patent

UNITED STATES PATENTS

| | | |
|---|---|---|
| 349,570 | Cook | Sept. 21, 1886 |
| 669,083 | Hachenberg | Mar. 5, 1901 |
| 1,600,155 | Wetzel | Sept. 14, 1926 |
| 1,920,332 | Weber | Aug. 1, 1933 |
| 2,571,400 | Williams | Oct. 16, 1951 |
| 2,608,448 | Williams | Aug. 26, 1952 |
| 2,723,165 | Hess | Nov. 8, 1955 |
| 2,861,846 | Webster | Nov. 25, 1958 |

FOREIGN PATENTS

| | | |
|---|---|---|
| 476,652 | Great Britain | Mar. 4, 1936 |